United States Patent [19]

Durand et al.

[11] Patent Number: 4,480,011

[45] Date of Patent: Oct. 30, 1984

[54] ANTI-CORROSION AND ANTI-FOULING MARINE COATINGS

[75] Inventors: Jean-Pierre Durand, Chatou; Denise Nicolas, Maurepas; Francois Dawans, Bougival; Ernest Maréchal, Paris; Maryvonne Brigodiot, Chatenay Malabry, all of France

[73] Assignee: Institut Francais du Petrole, Rueil-Malmaison, France

[21] Appl. No.: 401,428

[22] Filed: Jul. 23, 1982

[30] Foreign Application Priority Data

Jul. 24, 1981 [FR] France .................................. 81 14595

[51] Int. Cl.³ .............................................. B32B 27/06
[52] U.S. Cl. ..................... 428/474.4; 106/15.05; 427/409; 427/413; 428/462; 428/476.3; 428/492; 428/493; 428/907
[58] Field of Search ...................... 428/907, 462, 476.9, 428/500, 474.4, 492, 476.3, 493; 427/413, 409; 523/189-233; 106/15.05

[56] References Cited

U.S. PATENT DOCUMENTS

| | | | |
|---|---|---|---|
| 3,505,758 | 4/1970 | Willisford | 428/907 |
| 3,575,123 | 4/1971 | Shephard et al. | 428/907 |
| 4,221,839 | 9/1980 | de Graaf | 428/500 |
| 4,259,404 | 3/1981 | van Gils | 428/476.9 |
| 4,389,460 | 6/1983 | Dawans et al. | 428/461 |
| 4,401,703 | 8/1983 | Rodgers | 428/907 |

FOREIGN PATENT DOCUMENTS 7123054  7/1982  Japan ................. 428/476.9

*Primary Examiner*—Marion E. McCamish
*Assistant Examiner*—E. Rollins Buffalow
*Attorney, Agent, or Firm*—Millen & White

[57] ABSTRACT

Coating composition for protecting bodies immersed in sea water, comprising
- (a): a sub-layer of chlorinated natural rubber, and
- (b): an external layer comprising a polymer with amide groups.

An intermediate layer can be provided, said layer consisting of a modified chlorinated natural rubber.

16 Claims, No Drawings

ANTI-CORROSION AND ANTI-FOULING MARINE COATINGS

BACKGROUND OF THE INVENTION

The invention relates to marine coatings having anti-corrosion and anti-fouling properties.

Marine fouling, which results from the growth of marine organisms of vegetal or animal origin on the surface of immersed bodies, may have very detrimental consequences, such as an increased weight of the immersed structures and an accelerated corrosion. Marine fouling also increases the roughness of the ship hulls, and thus their resistance to displacement in water, which increases their fuel consumption in a proportion which may reach, for example, 40%.

An efficient manner to fight against marine fouling consists of maintaining a toxic material at an effective concentration and in continuous and homogeneous manner on the surface to be protected. The anti-fouling paints which have been employed up to now resort to this technique and operate by continuous release of a toxic agent—generally containing copper or tin—soluble in water. A number of methods have been developed, in order to control more efficiently the rate of liberation of the toxic agent in the aqueous medium; however, irrespective of their improvements, these anti fouling paints suffer from two major disadvantages:

on the one hand, the anti-fouling effect is obtained within a relatively short period, which requires frequent inoperative periods of the ships for cleaning of their hull; and on the other hand, the relatively high amounts of toxic agent required result in a pollution of the environmental nature.

SUMMARY OF THE INVENTION

New marine coatings with anti-corrosion and anti-fouling properties have now been discovered; they have an increased efficient time and do not result in a pollution of the environment. The coatings of the invention operate in a different manner than the anti-fouling marine coatings of the prior art. As a matter of fact, the latter operate essentially by lixiviation of a toxic agent, soluble in water, in the vicinity of the surface to be protected, while the coatings of the invention operate by preventing a too strong adhesion of the marine micro- and/or macrofoulings of animal or vegetal origin. The fouling deposits may thus be permanently removed, for example by the mere friction of water along the hull of the ship, during its movements, or periodically removed by mere washing with water jetting or by brushing of the hull, the latter operation being possibly effected under water in an inexpensive manner: it is not necessary to periodically maintain the ship in a drydock, to clean its hull.

As a rule, the coatings of the invention comprise:
at least one sub-layer of chlorinated natural rubber (anti-corrosion layer) and
a superficial layer of at least one polyamide (anti-fouling layer).

DETAILED DISCUSSION

The sub-layer applied directly on the support (hull of ship or any other immersed body) is generally mainly made of epoxy resin or chlorinated natural rubber, the latter being preferred for economic reasons.

The superficial layer (anti-fouling layer) of the coatings according to the invention may comprise any film-forming polyamide; however, for easier processing, preference is given to soluble polyamides or oligoamides. The following ones may be particularly mentioned:

fatty polyamides resulting from the reaction of a diamine with dimerized unsaturated fatty acids;

copolyamides such as, for example, a 6/6.6 copolyamide based on adipic acid/hexamethylene diamine and caprolactame, a 6/6.6/6.10 copolyamide based on adipic acid/hexamethylene diamine, decanedioic acid/hexamethylene diamine and caprolactame, a copolyamide of hexamethylene diamine/adipic acid, p,p'-diamino dicyclohexylmethane/adipic acid and caprolactame, a ternary 6/6.6/12 copolyamide of caprolactame, adipic acid/hexamethylene diamine and lauryllactame or a ternary 6/6.12/12 copolyamide of caprolactame, dodecanedioic acid/hexamethylene diamine and lauryllactame;

grafted or sequenced copolymers based on polyamides or copolyamides and on sequences or grafts based on polyethers, poly-epoxy or polyesters.

As a rule, these polyamides are soluble in alcohols or in mixtures of solvents containing at least one alcohol, particularly in such alcohols as methanol, ethanol, propanol, butanol or mixtures of these alcohols with aromatic or aliphatic hydrocarbons.

When the superficial layer consists of a polyamide, it is convenient according to the invention to introduce in the marine coating an intermediate layer, also called compatible layer, which improves the adhesion of the superficial layer, based on polyamides, to the sub-layer, based on chlorinated natural rubber.

The intermediate layer consists chiefly or chlorinated natural rubber modified as shown hereinafter.

The modified chlorinated natural rubber to be used for manufacturing the compatible intermediate layer may be obtained by different methods, particularly those having for object to attach polyamides or oligoamides containing amine groups, to attach various $C_4$ to $C_{12}$ aminoacids to their derivatives, such as amino-esters or amino-amides, or again to graft compatible acrylic monomers.

On the one hand, modifying chlorinated natural rubber by grafting acrylic monomers may be effected in solution, in the presence of free radical generating compounds, and at a temperature lower than the temperature at which chlorinated natural rubber begins to decompose ($<100°$ C.). Among the useful radical initiators, preference is given to benzoyl peroxide and to azo-bis-iso-butyronitrile. The concentrations of free radical generators to be used are generally in the range of 0.5 to 5% b.w. of the monomers. A preferred method consists of using nickel tetrakis-triphenyl - or tetrakis triethyl-phosphite as the initiator, these nickel compounds generating free radicals on the chlorinated natural rubber and thus facilitating the grafting reaction, as opposed to the homopolymerization. In that case, the nickel compounds content is generally from 0.2 to 5% b.w. of the monomers.

The acrylic monomers usually employed are selected more particularly from the following:

the esters of aliphatic monoalcohols, diols or aminoalcohols with carboxylic acids having a vinylic unsaturation, such as, for example, methyl, ethyl, propyl, butyl, 2-hydroxy ethyl or diethylaminoethyl acrylates and methacrylates, the amides with vinyl groups such as, for example, acrylamide, methacrylamide, N,N-dimethylaminopropyl methacrylamide.

On the other hand, the modification of chlorinated natural rubber by attachment thereto of amino-acids, amino-esters or amino-amides or by attachment of oligoamides or polyamides with amine groups may be effected at temperatures from 50° to 100° C. within solvents such as, for example, aromatic solvents (toluene) or chlorinated solvents (chloroform, chlorobenzene, orthodichlorobenzene).

Among the compounds to be attached to chlorinated natural rubber, preference is given to lower alkyl (for example, from $C_1$ to $C_4$) esters of $C_4$ $C_{12}$ aliphatic aminoacids, such as, for examples, ethyl 11-amino undecanoate and ethyl aminobutyrate, and also to soluble oligoamides and polyamides obtained, for example, by reacting diamines with dimerized unsaturated fatty acids.

The modification rate of the chlorinated natural rubber determined by titration of nitrogen and chlorine in the final product may range, for example, from about 5 to 30% b.w.

According to another method for manufacturing the coatings of the invention, the anti-fouling superficial layer is itself made chiefly of chlorinated natural rubber modified by a large proportion of oligoamides, polyamides or amino-amides. The oligoamides and polyamides obtained by reaction of a diamine with a dimerized unsaturated fatty acid are preferably used.

The so-constituted superficial layer is applied directly on the anti-corrosion sub-layer. This operation may be effected with modified chlorinated natural rubbers containing from 20% to 80% b.w. and preferably from 40 to 60% b.w. of oligoamides, polyamides or aminoamides.

The various layers constituting the coating may be applied by brushing or by gun-pulverizing dilute solutions of the diverse materials constituting said layers.

The coatings constituted as explained above have a good cohesion and a good adhesion, as well as excellent anti-fouling properties, when immersed in marine medium in a splash zone.

Further, as compared to conventional anti-fouling paints, the coatings of the invention are particularly advantageous from the economic point of view, as a consequence of their highly increased life time: their maintenance necessitates only very few inoperative periods of the ships.

Finally, a particularly advantageous aspect of these coatings is that they do not result in a pollution of the marine environment, in contrast to the conventional anti-fouling paints.

The following examples illustrate the invention but must not be considered as limitative thereof in any respect; example 1A is given by way of comparison.

There is first described the manufacture of modified chlorinated natural rubbers which can be used, depending on the case, as compatible intermediate layer or as superficial anti-fouling layer.

The chlorinated natural rubber which was used had a 67.6% b.w. chlorine content.

MANUFACTURE A 28 g of chlorinated natural rubber and 40 g of ethyl 11-amino undecanoate are dissolved in 250 ml or toluene and then heated at 80° C. for 3 hours in an inert atmosphere. The modified chlorinated natural rubber is isolated by precipitation in methanol and then dried up to constant weight. It contains 0.87% b.w. of nitrogen, which corresponds to a modification rate of 14.2% b.w.

MANUFACTURE B 56 g of chlorinated natural rubber and 80 g of ethyl 3-amino butyrate dissolved in 500 ml of toluene are heated at 50° C. for 8 hours in an inert atmosphere.

The modified chlorinated rubber is isolated by precipitation in methanol and dried up to constant weight. It contains 0.7% b.w. of nitrogen, corresponding to a modification rate of 6.6% b.w.

MANUFACTURE C 300 ml of methyl methacrylate and 0.88 g of nickel tetrakistriphenylphosphite are added to 70 g of chlorinated natural rubber dissolved in 300 ml of benzene. The reaction mixture is stirred at 35° C. for 6 hours. The modified chlorinated rubber is isolated by precipitation in methanol and dried up to constant weight. In contains 30% b.w. of methyl methacrylate, 85% of which has been grafted (the grafting rate is determined by extraction with methanol of the hydrolyzed homopolymer).

MANUFACTURE D

Manufacture C is repeated by replacing methyl methacrylate with the same weight of N,N-dimethyl aminopropyl methacrylamide. A grafted chlorinated rubber containing 7% b.w. of this monomer is obtained.

MANUFACTURE E 6 g of acrylamide and 0.12 g of benzoyl peroxide are added to 20 g of chlorinated natural rubber dissolved in 100 ml of toluene. After a 6 h reaction at 80° C., a modified chlorinated rubber is obtained, containing about 10% b.w. of grafted acrylamide after removal of the homopolymer.

MANUFACTURE F 25 g of chlorinated natural rubber and 25 g of a fatty polyamide (itself obtained by reaction ethylene diamine with dimerized linoleic acid) are heated for 7 hours at 80° C. as a solution in 500 ml of chlorobenzene. The modified chlorinated natural rubber, soluble in toluene, obtained at the end of the reaction, contains about 10% b.w. of polyamide.

MANUFACTURE G

Manufacture F is repeated with the use of 100 g of fatty polyamide (instead of 25 g). The resultant modified chlorinated rubber contains 40% b.w. of polyamide.

The modified chlorinated natural rubbers obtained by the Manufactures A to F are used as intermediate layer between an anti-corrosion sub-layer based on chlorinated natural rubber and a superficial anti-fouling layer based on polyamide (examples 1 to 7).

The modified chlorinated natural rubber of Manufacture G is applied directly as superficial anti-fouling layer on an anti-corrosion sub-layer based on chlorinated natural rubber (examples 8 and 9).

EXAMPLE 1

A layer of modified chlorinated natural rubber, such as described in Manufacture A, as above, as a 50 g/l solution in toluene, and a layer of copolyamide 6/6.6/6.10 as a 100 g/l solution in a mixture comprising 50% of methanol, 25% of xylene and 25% of n-butanol are pulverized on the surface of a 20×30 cm steel sheet previously coated with a sub-layer of anti-corrosion paint based on chlorinated natural rubber of an approximate thickness of 100 microns.

The overall thickness of the superfial anti-fouling layer and the compatible intermediate layer is 100 microns.

After immersion in a marine medium, in a splash zone, the inspection of the sample shows a good adhesion of the external polyamide sheet and very poor adhesion of foulants which can be removed by mere brushing.

The anti-fouling activity has been determined after 12, 24 and 48 months for this coating and those of the following examples. The results, expressed as % surface of the sample coated with marine organisms of vegetal or animal origin, are summerized in the following Table which gives the figures obtained before and after brushing.

TABLE

| | ANTI-FOULING ACTIVITY (% surface with deposit of organisms) | | | | | |
|---|---|---|---|---|---|---|
| | IMMERSION TIME (months) | | | | | |
| | 12 MONTHS | | 24 MONTHS | | 48 MONTHS | |
| EXAMPLES | A | B | A | B | A | B |
| 1 | 10 | 0 | 20 | 0 | 30 | 5 |
| 2 | 10 | 0 | 22 | 0 | 32 | 5 |
| 3 | 10 | 0 | 25 | 0 | 40 | 5 |
| 4 | 10 | 0 | 20 | 0 | 30 | 5 |
| 5 | 12 | 0 | 22 | 0 | 32 | 5 |
| 6 | 10 | 0 | 20 | 0 | 30 | 5 |
| 7 | 12 | 0 | 22 | 0 | 32 | 5 |
| 8 | 10 | 0 | 20 | 0 | 32 | 5 |
| 9 | 0 | 0 | 0 | 0 | 5 | 5 |

A: before brushing
B: after brushing

EXAMPLE 1A (comparison)

The coating is applied as in example 1, except that the intermediate layer of modified chlorinated natural rubber is omitted. The detachment of the superficial layer is observed.

EXAMPLE 2

Example 1 is repeated, the modified chlorinated natural rubber of Manufacture A being however replaced with that of Manufacture B. The results are very close to those of example 1.

EXAMPLE 3 a 50 g/l solution in toluene of chlorinated natural rubber grafted with methyl methacrylate, such as obtained in the above Manufacture C, and a 100 g/l solution in an isopropanol-xylene mixture of a fatty polyamide resulting from the reaction of ethylenediamine with dimerized linoleic acid, are pulverized successively on the surface of a 20×30 cm steel sheet previously coated with a sub-layer of anti-corrosion paint based on chlorinated natural rubber with a thickness of about 100 microns.

After immersion in a marine medium, in a splash zone, the inspection of the plate reveals an excellent adhesion of the polyamide layer as well as very little adhesion of foulants, which are removed be mere brushing.

EXAMPLE 4

Example 3 is repeated by replacing the superficial layer of fatty polyamide with a layer of copolyamide 6/6.6/6.10. The coating has a behaviour quite close to that of example 3.

EXAMPLE 5-7

Example 1 is repeated, while replacing, as concerns the intermediate layer, the modified natural rubber of Manufacture A, respectively with that of Manufacture D, that of Manufacture E and that of Manufacture F.

In each case, the resultant coating has, after immersion in a marine medium, in a splash zone, a good anti-fouling efficiency.

EXAMPLE 8

A superficial anti-fouling coating of modified chlorinated natural rubber according to Manufacture G (containing 40% b.w. of fatty polyamide) is directly applied on a steel sheet previously coated with a sub-layer of 100μ thickness of anti-fouling paint based on chlorinated natural rubber.

After immersion in sea water in a splash zone, the periodic inspection of the coating shows a good behaviour (see Table).

EXAMPLE 9

A steel sheet coated as described in Example 8 is immersed on a revolving rotor, so that the sheet has a linear velocity of 1 m/s.

At each inspection, it is observed that the importance of the deposit of marine organisms, before brushing, is smaller than in the preceding example (see Table).

What is claimed is:

1. A coating composition, useful for protecting immersed bodies, which comprises:
    (a) at least one sub-layer, based on chlorinated natural rubber, in contact with the surface of the body to be coated;
    (b) an external layer comprising at least one polyamide; and
    (c) at least one intermediate layer consisting mainly of chlorinated natural rubber modified by grafting acrylic monomers thereon, or by attaching amino-acids, amino-esters, amino-amides, oligoamides or polyamides thereto.

2. A coating composition according to claim 1, wherein said intermediate layer is a chlorinated natural rubber modified by grafting at least one acrylic monomer thereon, said monomer being an alkyl, hydroxyalkyl or dialkylaminoalkyl acrylate or methacrylate, or a vinylic amide.

3. A coating composition according to claim 1, wherein said intermediate layer is a chlorinated natural rubber modified by reaction with a polyamide or an oligoamide containing amine groups.

4. A coating composition according to claim 3, wherein said polyamide is a fatty polyamide obtained by reacting a diamine with a dimerized unsaturated fatty acid.

5. A coating composition according to claim 3, wherein said reaction is effected at 50°–100° C., in an aromatic hydrocarbon solvent or a chlorinated hydrocarbon solvent.

6. A coating composition according to claim 3, wherein the modification rate of said chlorinated natural rubber is from 5 to 30% by weight.

7. A coating composition according to claim 1, wherein said intermediate layer is a chlorinated natural rubber modified by reaction with a $C_4$ to $C_{12}$ amino-acid or a corresponding amino-ester or amino-amide.

8. A coating composition according to claim 7, wherein said chlorinated natural rubber is modified by reaction with a lower alkyl ester of a $C_4$ to $C_{12}$ aliphatic amino acid.

9. A coating composition according to claim 7, wherein said reaction is effected at 50°–100° C., in an aromatic hydrocarbon solvent or a chlorinated hydrocarbon solvent.

10. A coating composition according to claim 7, wherein the modification rate of said chlorinated natural rubber is from 5 to 30% by weight.

11. A coating composition according to claim 1, wherein the external layer comprises a polyamide soluble in an alcohol or a mixture of solvents containing at least one alcohol.

12. A coating composition according to claim 11, wherein said polyamide is a copolyamide 6/6.6 based on adipic acid/hexamethylene diamine and caprolactame, a copolyamide 6/6.6/6.10 based on adipic acid/hexamethylene diamine, decane dioic acid/hexamethylene diamine and caprolactame, a copolyamide of hexamethylene diamine/adipic acid, p,p'-diaminodicyclohexyl methane/adipic acid and caprolactame, a ternary copolyamide 6/6.6/12 of caprolactame, adipic acid/hexamethylene diamine and lauryl lactame or a ternary copolyamide 6/6.12/12 of caprolactame, dodecane dioic acid/hexamethylene diamine and lauryl lactame.

13. A coating composition according to claim 11, wherein said polyamide is a fatty polyamide obtained by reacting a diamine with a dimerized unsaturated fatty acid.

14. A coating composition, useful for protecting immersed bodies, which comprises:
 (a) at least one sub-layer, based on chlorinated natural rubber, in contact with the surface of the body to be coated; and
 (b) an external layer consisting mainly of modified chlorinated natural rubber containing 20–80% by weight of oligoamides, polyamides or aminoamides.

15. A coating composition according to claim 14, wherein said modified chlorinated natural rubber has a content of oligoamides, polyamides or amino-amides of 40 to 60%.

16. A coating composition according to claim 14, wherein said polyamide is a fatty polyamide obtained by reacting a diamine with a dimerized unsaturated fatty acid.

* * * * *